Jan. 17, 1939. P. SCHLUMBOHM 2,144,441
METHOD OF CONDITIONING AN ABSORPTION REFRIGERATING SYSTEM
Original Filed Oct. 27, 1932

Inventor:

Patented Jan. 17, 1939

2,144,441

UNITED STATES PATENT OFFICE 2,144,441

METHOD OF CONDITIONING AN ABSORPTION REFRIGERATING SYSTEM

Peter Schlumbohm, New York, N. Y.

Original application October 27, 1932, Serial No. 639,863. Divided and this application August 9, 1937, Serial No. 158,139. In Germany October 31, 1931

2 Claims. (Cl. 62—179)

The invention relates to a method of conditioning absorption refrigerating systems. The invention is of special value for systems in which the pressure of the absorbing means is very low, e. g. when using water or ice or sulphuric acid or silica gel as absorbing means.

It is the object of my invention to completely eliminate the air out of such a system.

Following my invention this can be done by shutting off the absorber from the evaporator and evacuating the absorber separately, creating therein a vacuum as low as the vapor pressure of the absorbing means. Accordingly, the evaporator is evacuated separately, creating therein a pressure which corresponds to the vapor pressure of the refrigerant. By restoring the communication between the evaporator and the absorber, the vapors of the refrigerant flow into the absorber without being slowed down in this flow by any air. Especially when refrigerants of great specific vapor volume are used, like water or methyl alcohol, the effect of my new method is of great importance.

For pumping the air out of the absorber I use a good high-vacuum pump, as for instance in the case of using acid as absorbing means the vacuum should be as low as 0.01 mm. or even 0.001 mm. Hg in the absorber before starting the absorption process.

Eliminating the air from the evaporator is much simpler, as the air will be washed out of the system by the vapors of the refrigerant when the evaporator is connected with an air pump.

Figure 1:
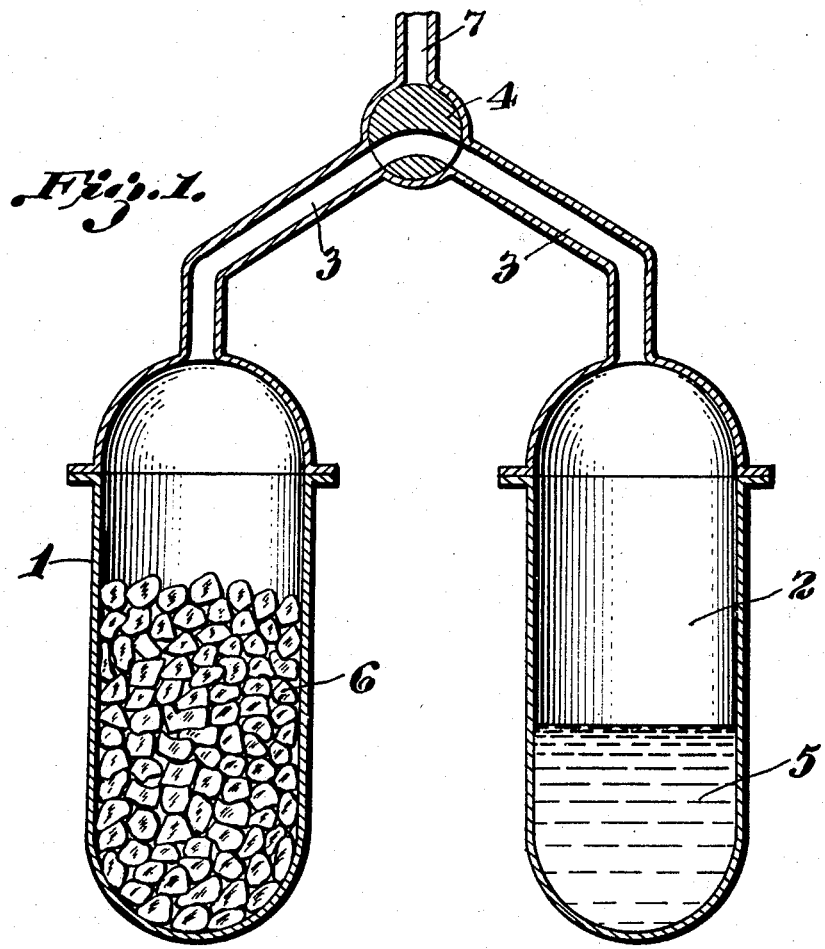
Figure 2:
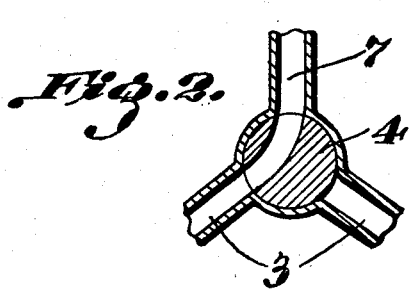
Figure 3:
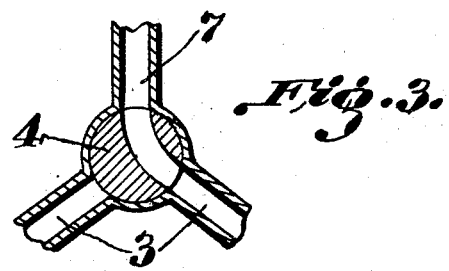

The invention is illustrated, by way of example and in diagrammatical style, in Fig. 1–Fig. 3 of the accompanying drawing.

In Fig. 1 an absorption apparatus is shown, and in Fig. 2 and Fig. 3 the different positions of a valve are illustrated.

This new method of conditioning an absorption refrigerating system was originally developed in connection with the specific requirements of the method of refrigeration as described in my U. S. Patent No. 2,105,098, of which the present application is a divisional case. In all the numerous examples as given in Patent No. 2,105,098 there is always the deciding feature of an absorbing means which has a low vapor pressure and of a refrigerant which has a higher vapor pressure, for instance: frozen water as absorbing means, and ammonia as refrigerant; or frozen brine, or frozen acid or frozen base being used as absorbing means, all of them having low vapor pressure when they are in their concentrated form at the beginning of the absorption process. In the accompanying drawing the handling of such absorption material with low vapor pressure is shown.

In Fig. 1 an absorber 1 is filled with the absorbing means 6, e. g. ice. The evaporator 2 is filled with refrigerant 5 and both containers 1 and 2 are connected by a tube 3 through which the vapors of the refrigerant may flow from the evaporator to the absorber when a three-way valve 4 is in the position as shown in Fig. 1. This position of valve 4 will, however, only be chosen, after the valve has been put into the position as illustrated in Fig. 2 to allow evacuating the absorber 1 and after the valve has been shifted into position as illustrated in Fig. 3 to allow evacuating the evaporator 2. During the latter two positions of the valve the tube 7 of the valve 4 is connected with an air pump.

The installation as shown in Fig. 1 represents the minimum of valves required for the various operations as mentioned above, namely one valve only. Of course, also equipment with several valves may be used to perform the new method.

Having now described the nature of my invention and indicated by way of example the manner in which it is to be performed, what I claim is:

1. The method of conditioning a refrigerating absorption system having an absorber filled with absorbing means of low vapor pressure and an evaporator filled with a refrigerant, which comprises shutting off the absorber from the evaporator, creating a vacuum within said absorber as low as the vapor pressure of the absorbing means, reducing the pressure within said evaporator to the vapor pressure of said refrigerant and restoring communication between said absorber and said evaporator to allow the vapor of said refrigerant to flow into said absorber.

2. In the method as claimed in claim 1, the step of utilizing a three-way-valve with its three ways for the three operations of connecting the absorber separately with an air pump, of connecting the evaporator separately with an air pump, and of restoring communication between the evaporator and the absorber.

PETER SCHLUMBOHM.